United States Patent [19]

Asada et al.

[11] Patent Number: 5,141,338
[45] Date of Patent: Aug. 25, 1992

[54] DYNAMIC PRESSURE TYPE FLUID BEARING APPARATUS

[75] Inventors: Takafumi Asada, Hirakata; Masato Morimoto; Takashi Sonoda, both of Neyagawa, all of Japan

[73] Assignee: Matsushita Electric Industrial Co., Ltd., Osaka, Japan

[21] Appl. No.: 610,969

[22] Filed: Nov. 9, 1990

[30] Foreign Application Priority Data

Nov. 10, 1989 [JP] Japan .................. 1-293553
Nov. 17, 1989 [JP] Japan .................. 1-300438

[51] Int. Cl.$^5$ .............................................. F16C 32/06
[52] U.S. Cl. .................................... 384/114; 384/100
[58] Field of Search ............... 384/100, 107, 112, 114, 384/115, 118, 120, 287, 292, 291

[56] References Cited

U.S. PATENT DOCUMENTS

| | | | |
|---|---|---|---|
| 4,538,929 | 9/1985 | Ehrentraut et al. | 384/120 |
| 4,573,807 | 3/1986 | Asada et al. | 384/100 |
| 4,797,009 | 1/1989 | Yamazaki | 384/100 |
| 4,798,480 | 1/1989 | Van Beek | 384/114 |
| 4,961,122 | 10/1990 | Sakai et al. | 384/114 X |

FOREIGN PATENT DOCUMENTS 60-78106 5/1985 Japan .
285320 11/1988 Japan ........................ 384/100

Primary Examiner—Thomas R. Hannon
Attorney, Agent, or Firm—Wenderoth, Lind & Ponack

[57] ABSTRACT

A dynamic pressure type fluid bearing device includes: a shaft; a sleeve into which the shaft is fitted to be rotatable relative to the shaft; two dynamic pressure generating grooves provided on either peripheral surface of the shaft or the inner peripheral surface of the sleeve; and a lubricant held between the shaft and the sleeve. The device has a void, enclosing air, interposed between the two dynamic pressure generating grooves, wherein each of the dynamic pressure generating grooves is not less than four microns in depth and makes an acute angle of less than 20° with a rotational direction of the shaft or the sleeve. The fluid bearing device can include: a sleeve; a shaft fitted into the sleeve, one end surface of which is in contact with a thrust bearing fixed to the sleeve; a dynamic pressure generating groove provided on either the inner peripheral surface of the sleeve or the peripheral surface of the shaft; and a lubricant provided to enclose a space between the shaft and the sleeve as well as the thrust bearing, wherein the dynamic pressure generating groove is not less than four microns in depth and makes an acute angle of less than 17° with a rotational direction of the shaft or the sleeve.

2 Claims, 3 Drawing Sheets

DYNAMIC PRESSURE TYPE FLUID BEARING APPARATUS

BACKGROUND OF THE INVENTION

The present invention relates to a dynamic pressure type fluid bearing device for use in the rotary head cylinder of a disk driving apparatus and a video tape recorder and capable of rotating the rotary head cylinder at a high speed.

The miniaturization and functionality of electrical machinery and equipment have increased remarkably in recent years. To promote this trend, it is necessary that a video tape recorder and a disk driving device be provided with a bearing capable of rotating at a high speed in the main shaft of the rotary head cylinder thereof. To this end, a dynamic pressure type fluid bearing device is used as the bearing.

Examples of conventional dynamic pressure type fluid bearing devices are described with reference to the drawings.

Referring to FIG. 4 which is a sectional view showing a conventional dynamic pressure type fluid bearing device, a shaft 41 is rotatably fitted into a sleeve 42. A thrust plate 43, fixed to an end of the sleeve 42, is in contact with an end surface 41A of the shaft 41. The thrust plate 43 is provided with a dynamic pressure generating groove 43A containing a lubricant 44. Thus, a thrust bearing is constituted. Dynamic pressure generating grooves 42A and 42B are formed on the inner peripheral surface of the sleeve 42 or the peripheral surface of the shaft 41. The grooves 42A and 42B contain a lubricant 44, respectively. Thus, a radial bearing is constituted. As shown in FIG. 1, the grooves 42A and 42B make acute angles of $\theta_1$ and $\theta_2$ generally ranging from 25° to 40° with the rotational direction of the shaft 41 or the sleeve 42. Vents 42C and 42D are formed through the sleeve 42.

The operation of the dynamic pressure type fluid bearing device of the above construction is described below. When a motor not shown is energized, the shaft 41 or the sleeve 42 to which the thrust plate 43 is fixed starts rotating. The lubricant 44 generates pressure due to the pumping operation of the grooves 41A, 42A and 42B. There is no contact between the shaft 41 and the sleeve 42 as well as the thrust plate 43 while they are rotating. As disclosed in Japanese Laid-Open Patent Publication No. 60-78106, the vent 42C is provided to discharge air from a void 42E when the dynamic pressure type fluid bearing device is assembled by fitting the shaft 41 into the sleeve 42. The vent 42D is provided to communicate outside air and air in a void 42F with each other when the volume of the air in the void 42F changes. Thus, the pressure of the void 42F does not change.

In view of a growing demand in recent years for the development of a dynamic pressure type fluid bearing device having a sleeve and a shaft capable of rotating at a higher speed, the above structure has the following disadvantages. That is, the lubricant 44 introduced into the grooves 42A and 42B is discharged from the vent 42D of the sleeve 42 by the centrifugal force when the rotating member is rotating at a high speed, thus resulting in a shortage of the lubricant 44. Consequently, the rigidity of the sleeve 42 or the shaft 41 become insufficient and the shaft 42 rotates off its axis. That is, the rotating members are seized to each other so as not to operate normally.

In recent years, a disk driving device has a very dense structure and has become compact. Therefore, a highly accurate disk driving device having the following structure is in demand: in the main shaft for rotating the disk, a radial bearing having a short span and in addition is thin, and the shaft is off its axis not more than one micron.

Another example of a conventional fluid bearing device is described with reference to FIGS. 5 and 6 which are sectional views thereof. A sleeve 12 is fixed to a chassis 11 with screws 21. A shaft 13 is rotatably fitted into the sleeve 12. The bottom end 13B of the shaft 13 contacts a thrust bearing 14 and is subjected to a thrust load, thus constituting a pivot bearing. The thrust bearing 14 is supported with a thrust receiving plate 15 fixed to the sleeve 12 with the screws 21. The shaft 13 has a hub 16 and a rotor 17 fixed thereto in the vicinity of the top end 13A of the shaft 13. Therefore, the hub 16 and the rotor 17 rotate together with the rotation of the shaft 13. A vent 12B is formed through the sleeve 12 and a herringbone dynamic pressure generating groove 12A is formed on the peripheral surface of the shaft 13 or the inner peripheral surface of the sleeve 12. The groove 12A generally makes an angle $\beta$ of approximately 30° with the rotational direction of the shaft 13 and the depth thereof is almost the same as the 2-3 microns interval between the shaft 13 and the sleeve 12 in the radius direction of the shaft 13. Lubricants 18A and 18B mainly composed of mineral oil are provided in the space between shaft 13 and the sleeve 12 and the space between the shaft 13 and the thrust bearing 14, respectively. A rotary disk 19 is mounted over the hub 16.

The operation of the fluid bearing device of the above structure is described below. When a motor not shown is energized, the rotor 17, the hub 16, and the shaft 13 start rotating. As a result, the lubricant 18a generates pressure due to the pumping operation of the groove 12A, and the shaft 13 rotates without contacting the sleeve 12 and the thrust bearing 14.

The above structure, however, has the following disadvantages.

The first is that as shown in FIG. 6, without the sleeve 12 being provided with the vent 12B, the temperatures of the sleeve 12 and the periphery thereof rise when the shaft 13 is rotating at a high speed. As a result, air 20 which has penetrated into the bearing device thermally expands and the air 20 presses the lubricant 18A which has adhered to the shaft 13 outside as shown by 18C in FIG. 6. Thus, the amount of the lubricant 18A becomes less than desired. Additionally, since the diameter of the vent 12B is small, it takes much time to form the vent 12B in the sleeve 12 with a drill, resulting in low productivity.

The second is concerned with the configuration of the shaft 13. Referring to FIG. 5, in order to prevent the abrasion between the bottom end 13B of the shaft 13 and the thrust bearing 14, it is necessary that the bottom end 13B be made of hard stainless steel and the radius of the spherical bottom end surface 13B be great, for example, 5 to 6 mm. The thrust bearing 14 is made of silicon carbide or silicon nitride. The lubricants 18A and 18B consist of viscous mineral oil of approximately 100 centistokes at 20° C. The friction torques of the radial bearing and the thrust bearing 14 become very great at a temperature as low as 0°. The radius of the spherical top end surface 13A of the shaft 13 is required to be small, for example, approximately 3 mm so as to reliably connect the rotary disk 19 with the bearing device. That is, the radii of the two spherical surfaces are different from each other. Therefore, this fluid bearing device has a disadvantage in that it takes time and labor to correctly distinguish both members 13A and 13B from each other in the process of mass production.

SUMMARY OF THE INVENTION

Accordingly, an essential object of the present invention is to provide a dynamic pressure type fluid bearing device eliminating the need for the formation of a vent.

Another object of the present invention is to provide a dynamic pressure type fluid bearing device requiring no vents, having a shaft in which the radius of the bottom end surface as equal to that of the top end surface, which is easy to produce, and well-resistant to wear.

In accomplishing these and other objects, according to one aspect of the present invention, there is provided a dynamic pressure type fluid bearing device comprising: a shaft; a sleeve into which the shaft is fitted to be rotatable relative to the shaft; two dynamic pressure generating grooves provided on one of a peripheral surface of the shaft and an inner peripheral surface of the sleeve; and a lubricant held between the shaft and the sleeve; the device having a void, enclosing air, interposed between the two pairs of dynamic pressure generating grooves, wherein each of the dynamic pressure generating grooves is not less than four microns in depth and makes an acute angle of less than 20° with a rotational direction of the shaft or the sleeve.

By the above construction of the aspect of the present invention, since the two grooves not less than four microns in depth make an acute angle of less than 20° with the rotational direction of the shaft or the sleeve, air in the void provided between the grooves can be smoothly discharged therefrom. Further, the grooves are unsymmetrically configured in such a manner that the length of the outer side of each groove is greater than the length of the inner side thereof. Therefore, the lubricant is not discharged outside and the rotating members are reliably capable of rotating at a high speed.

According to another aspect of the present invention, there is provided a fluid bearing device comprising: a sleeve; a shaft fitted into the sleeve, one end surface of which is in contact with a thrust bearing fixed to the sleeve; a dynamic pressure generating groove provided on one of an inner peripheral surface of the sleeve and a peripheral surface of the shaft; and a lubricant provided to enclose a space between the shaft and the sleeve as well as the thrust bearing, wherein the dynamic pressure generating groove is not less than four microns in depth and makes an acute angle of less than 17° with a rotational direction of the shaft or the sleeve.

By the above construction of the aspect of the present invention, the groove is large in depth and makes a small angle of not more than 17° with the rotational direction of the shaft or the sleeve, air which has permeated into the bearing device can be reliably discharged therefrom without any vent. Therefore, the rotating members can reliably perform their functions.

Further, titanium carbide is used as the material of the thrust bearing and purfluoropolyethers are used as the lubricant. Therefore, a thrust pivot bearing is sufficiently resistant to wear even when the radius of the hemispherical bottom end surface is equal to that of the top end surface thereof.

BRIEF DESCRIPTION OF THE DRAWINGS

These and other objects and features of the present invention will become clear from the following description taken in conjunction with the accompanying drawings, in which.

DETAILED DESCRIPTION OF THE EMBODIMENTS

Figure 1:
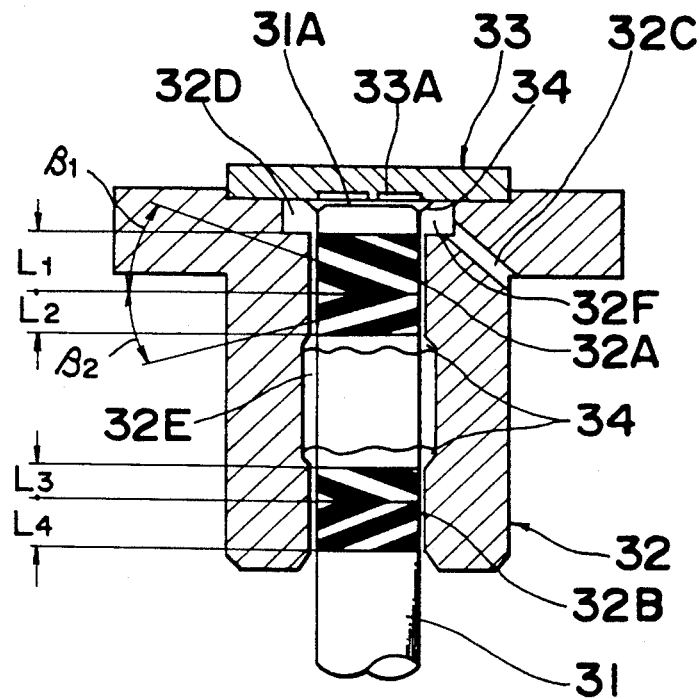
FIG. 1 is a sectional view showing a dynamic pressure type fluid bearing device according to a first embodiment of the present invention.

Before the description of the present invention proceeds, it is to be noted that like parts are designated by like reference numerals throughout the accompanying drawings.

Figure 2:
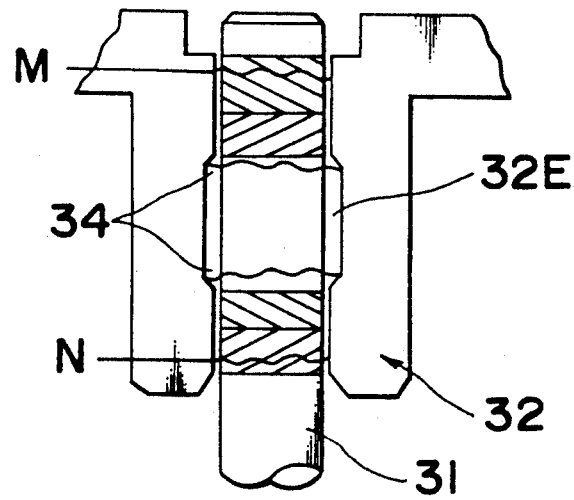
FIG. 2 is an illustration for describing the method for holding a lubricant in the device.

Referring to FIGS. 1 and 2, a dynamic pressure type fluid bearing device according to a first embodiment of the present invention is shown. Referring to FIG. 1 which is a sectional view showing the dynamic pressure type fluid bearing device, a shaft 31 is rotatably fitted into a sleeve 32. A thrust plate 33, fixed to an end surface of the sleeve 32, is in contact with an end surface 31A of the shaft 31. The thrust plate 33 is provided with a dynamic pressure generating groove 33A containing a lubricant 34 at the inner surface of the thrust plate 33. Thus, a thrust bearing is constituted. Two dynamic pressure generating grooves 32A and 32B are formed on the peripheral surface of the shaft 31 respectively having inner parts on the end toward the middle of the length of the shaft and other parts on the ends of the shaft. The grooves 32A and 32B contain a lubricant 34. Thus, a radial bearing is constituted. As shown in FIG. 1, each of the grooves 32A and 32B makes an acute angle of $\beta_1$ and $\beta_2$ of less than 20° with the rotational direction of the shaft 31 or the sleeve 32. The depths of the grooves 32A and 32B are as great as 4 microns or more. A vent 32C communicating with a void 32F is formed in the sleeve 32. A void 32E enclosing air is interposed between the grooves 32A and 32B.

The operation of the dynamic pressure type fluid bearing device is described below. When a motor not shown is energized, the sleeve 32 to which the thrust plate 33 is fixed starts rotating. The lubricant 34 generates pressure due to the pumping operation of the grooves 31A, 32A, and 32B. There is no contact between the shaft 31 and the sleeve 32 while they are rotating. The vent 32C is provided to discharge air from the void 32E when the dynamic pressure type fluid bearing device is assembled by fitting the shaft 31 into the sleeve 32. According to the first embodiment, air enclosed in the void 32E expands and tends to flow out of the void 32E due to the rise of the temperature of the device and the fall of the pressure in the periphery of the void 32E when the sleeve 32 is rotating at a high speed. The grooves 32A and 32B form the acute angles $\beta_1$ and $\beta_2$ of less than 20°, respectively with the rotational direction of the sleeve 32, and only a small resistance is provided by the grooves 32A and 32B to the air. Thus, the air can be smoothly discharged outside. If the angles $\beta_1$ and $\beta_2$ are not less than 20° as in a conventional structure, it is difficult to discharge air outside and the sleeve 32 is incapable of rotating at a high speed. In addition, since the depths of the grooves 32A and 32B are not less than four microns, air enclosed in the void 32E can be smoothly discharged from the void 32E. If the depths of the grooves 32A and 32B are not more than three microns, it is difficult to discharge the air outside. According to the first embodiment, since the air can be smoothly discharged outside from the void 32E, the spaces between the shaft 31 and the sleeve 32 and between the shaft 31 and the thrust plate 33 can always be lubricated. Therefore, the sleeve 32 is capable of stably rotating at a high speed. Further, since a vent for communicating with the void 32E is not formed at the sleeve 32, the lubricant is not discharged therethrough, unlike the conventional art.

According to the first embodiment, the relationship between the lengths L1 and L2 of the outer and inner parts of groove 32A and the relationship between the lengths L3 and L4 of the inner and outer parts of groove 32B are respectively as follows: L1>L2, L3<L4. More specifically, the length L1 of the outer part of the groove 32A is greater than the length L2 of the inner part thereof, and the length L4 of the outer part of the groove 32B is greater than the length L3 of the inner part thereof. That is, the outer part and the inner parts of each of the grooves 32A and 32B are unsymmetrical relative to each other. According to the configuration of the grooves 32A and 32B, layers M and N are formed between air and the lubricant 34. Consequently, the lubricant 34 is reliably enclosed in the sealed void 32E without flowing outside. Therefore, the sleeve 32 is capable of stably rotating at a high speed.

As described above, the grooves 32A and 32B not less than four microns deep make an acute angle of less than 20° with the rotational direction of the sleeve 32 and air is enclosed in the void 32E provided between the grooves 32A and 32B. Further, each of the grooves 32A and 32B is unsymmetrically configured in such a manner that the length L1 and L4 of the outer part of each groove is greater than the length L2 and L3 of the inner part thereof, respectively. Therefore, the lubricant 34 is not discharged outside and the rotating members are capable of stably rotating at a high speed.

In the first embodiment, the upper surface 31A of the shaft 31 can be formed as a pivot bearing. The grooves 32A and 32B according to the first embodiment can be formed on the inner peripheral surface of the sleeve 32 instead of the peripheral surface of the shaft 31. A similar operation and advantage can be obtained by rotating the shaft 31 instead of the sleeve 32.

Figure 3:
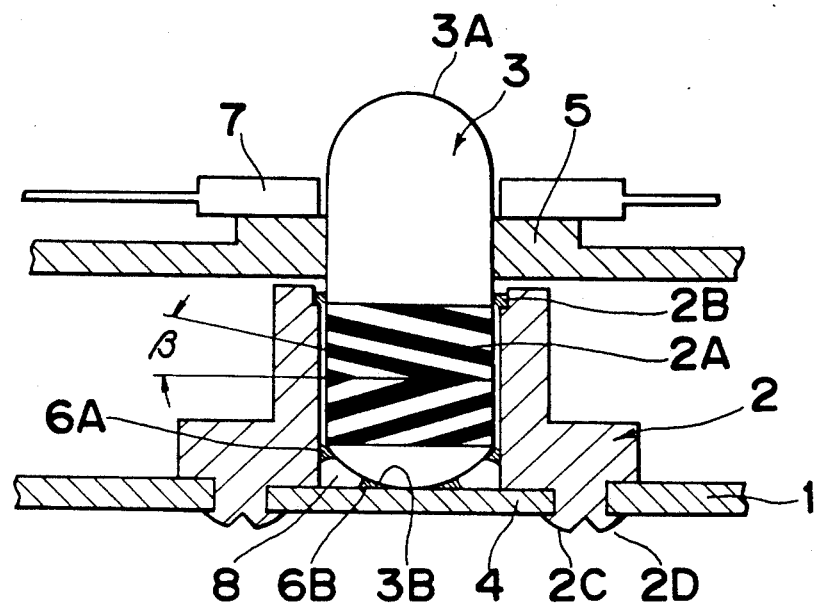
FIG. 3 is a sectional view showing a fluid bearing device according to a second embodiment of the present invention.
Figure 4:
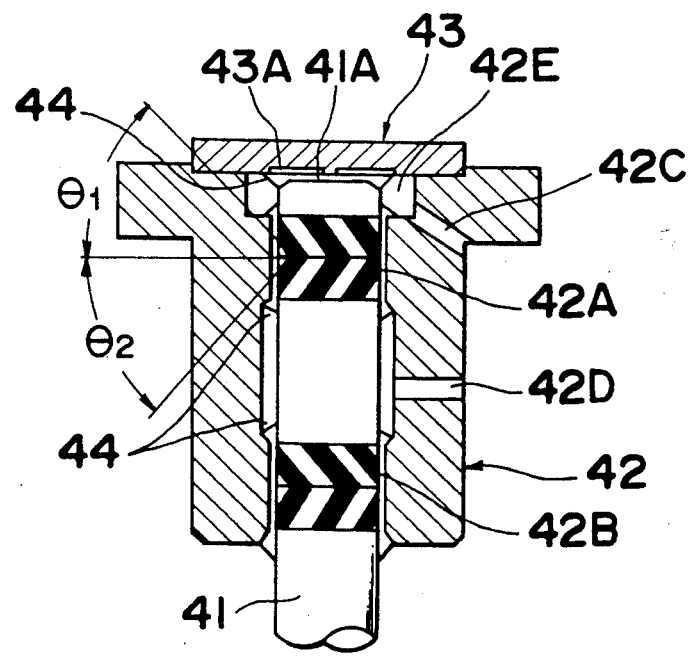
FIG. 4 is a sectional view showing a conventional dynamic pressure type fluid bearing device.
Figure 5:
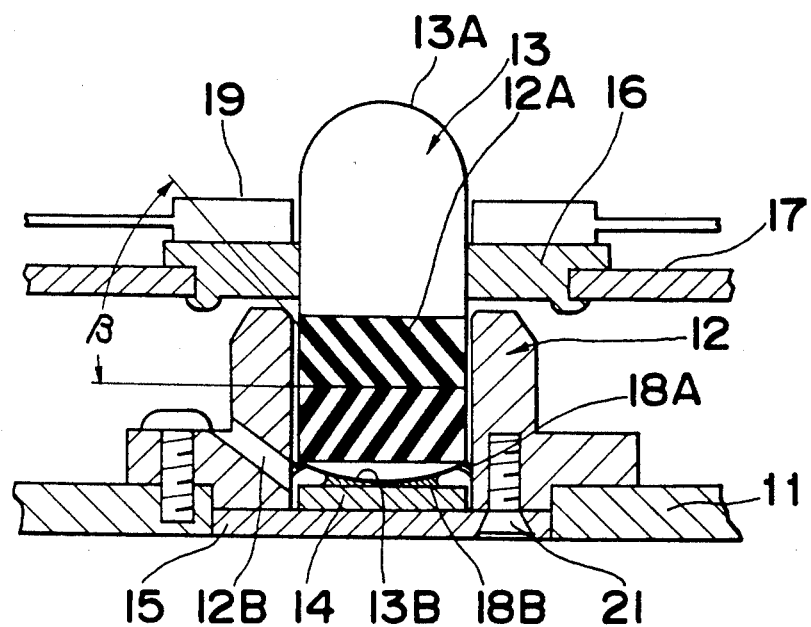
FIG. 5 is a sectional view showing another conventional fluid bearing device.
Figure 6:
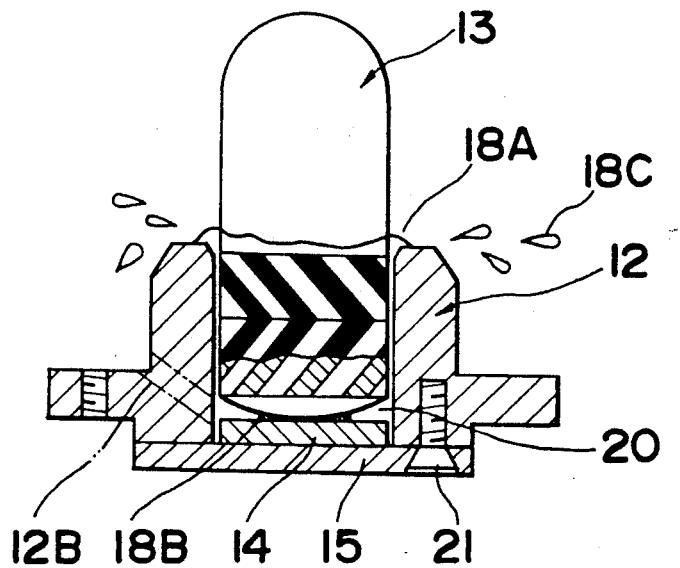
FIG. 6 is a sectional view showing the disadvantage of the fluid bearing device shown in FIG. 5.

A fluid bearing device according to a second embodiment of the present invention is described below with reference to FIG. 3 which is a sectional view showing the fluid bearing device. A sleeve 2 is riveted to a chassis 1 by a riveting portion 2D. A shaft 3 is rotatably fitted into the sleeve 2. The bottom surface 3B of the shaft 3 is in contact with a thrust bearing 4 and is subjected to a thrust load. Thus, a pivot bearing is constituted. The thrust bearing 4 is riveted to the sleeve 2 by a riveting portion 2C and the sleeve 2 is closely attached to the thrust bearing 4. The shaft 3 has a rotor hub 5 fixed thereto in the vicinity of the top end 3A of the shaft 3. Therefore, the rotor hub 5 rotates with the rotation of the shaft 3.

The shaft 3 has a dynamic pressure generating groove 2A on the peripheral surface thereof, and the sleeve 2 is provided with an oil storing portion 2B having a greater diameter than the other portions and interposed between the sleeve 2 and the shaft 3. The groove 2A makes an angle $\beta$ of not more than 17° with the rotational direction of the shaft 3. The depth thereof is approximately 4–9 microns greater than the 2–3 microns interval between the shaft 3 and the sleeve 2 in the radius direction of the shaft 3. The radius of the spherical bottom end surface 3B of the shaft 3 functioning as a pivot bearing may be made equal to that of the top end surface 3A thereof. Reference numerals 6A and 6B denote fluorine group lubricants such as purfluoropolyethers low in viscosity as low as approximately 30 centistokes at 20°. Z-03 manufactured by Montefluos Co., Ltd. or SJ-30 manufactured by NOK Co., Ltd. is used as the lubricants 6A and 6B. Reference numeral 8 denotes air which has penetrated into a space in the bearing portion. A rotary disk 7 fixed to the shaft 3 at the top end 3A thereof rotates with the rotation of the shaft 3.

The operation of the fluid bearing device of the above construction is described below with reference to FIG. 3.

When a motor not shown is energized, the rotor hub 5, the shaft 3, and the rotary disk 7 start rotating. As a result, the lubricant 6A generates pressure due to the pumping operation of the groove 2A. The shaft 3 rotates without contacting the sleeve 2. With the operation of the above members, the air 8 which has penetrated into the space between the shaft 3 and the sleeve 2 as well as the thrust bearing 4 thermally expands due to the rise of the temperatures of the above members. The air 8 can be discharged outside through the groove 2A during the non-operation because the groove 2A formed in the sleeve 2 has a sufficient depth of not less than four microns. The groove 2A makes an acute angle $\beta$ of not more than 17° with the rotational direction or fluid. Therefore, the air 8 can be smoothly discharged outside through the groove 2A even while the shaft 3 is rotating. The oil storing portion 2B is provided to hold the lubricant 6A for filling the groove 2A therewith after the air 8 is discharged outside. A vent is not formed in the sleeve 2, unlike the conventional structure, but the shaft 3 is capable of reliably rotating at a high speed.

The shaft 3 is made of hardened martensite stainless steel. The thrust bearing 4 consists of titanium carbide or partly stabilized zirconia (PSZ) and its surface roughness is as precise as 0.3 microns or less. Since the lubricant 6B consists of a fluorine group substance, the friction between bottom surface 3B and the thrust bearing 4 is greatly reduced. Therefore, supposing that the diameter of the shaft 3 is approximately 4 mm, the bottom end 3B of the shaft 3 is sufficiently resistant to wear even when the radius of the bottom end surface 3B is equal to the radius, which is as small as approximately 3 mm, of the top end surface 3A thereof. The wear resistance of the following substances are as follows: alumina<silicon carbide=silicon nitride<PSZ=titanium carbide. Therefore, a thrust bearing 4 consisting of PSZ or titanium carbide is durable.

As described above, according the second embodiment, the dynamic pressure generating groove is not less than four microns in depth and makes an acute angle of not more than 17° with the rotational direction of the shaft 3 or the fluid. Therefore, the shaft 3 reliably rotates at a high speed although sleeve 2 has no vent therethrough, unlike the conventional construction. Further, since the lubricants 6A and 6B consist of the fluorine group substance and the thrust bearing 4 is made of titanium carbide, the friction between the bottom end 3B and the thrust bearing 4 can be greatly reduced, so that the bottom end 3B thereof is sufficiently resistant to wear, even though the radius of the bottom end surface 3B of the shaft 3 is equal to that of the top end surface 3A thereof.

The groove according to the second embodiment can be formed on the inner peripheral surface of the sleeve 2 instead of the peripheral surface of the shaft 3. A similar operation and advantage can be obtained by rotating the sleeve 2 and the thrust bearing 4 instead of rotating the shaft 3.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A dynamic pressure type fluid bearing device comprising:
   a shaft;
   a sleeve into which said shaft is fitted to be rotatable relative to said shaft;
   two pairs of dynamic pressure generating grooves provided on one of a peripheral surface of said shaft and an inner peripheral surface of said sleeve; and
   a lubricant held between said shaft and said sleeve;
   said device having an unvented void, enclosing air, interposed between said two pairs of dynamic pressure generating grooves,
   wherein each of said dynamic pressure generating grooves is not less than four microns in depth and is at an acute angle of less than 20° with a rotational direction of said shaft whereby, during the operation of the bearing device, when the pressure of air in said void increases, it can escape through said lubricant filling said grooves.

2. A dynamic pressure type fluid bearing device as claimed in claim 1, wherein each of said dynamic pressure generating grooves has an inner portion adjacent said void extending at a positive acute angle and an outer portion remote from said void extending at a positive acute angle the length of the outer portion of each of said grooves being greater than the length of the inner portion thereof.

* * * * *